United States Patent
Dipper et al.

(10) Patent No.: US 9,965,512 B2
(45) Date of Patent: May 8, 2018

(54) OPERATORS FOR CONSTANTS IN AGGREGATED FORMULAS

(71) Applicants: Stefan Dipper, Wiesloch (DE); Sebastian Schroetel, Walldorf (DE); Michael Wilking, Walldorf (DE); Christof Mueller, Walldorf (DE); Tim Kaiser, Walldorf (DE)

(72) Inventors: Stefan Dipper, Wiesloch (DE); Sebastian Schroetel, Walldorf (DE); Michael Wilking, Walldorf (DE); Christof Mueller, Walldorf (DE); Tim Kaiser, Walldorf (DE)

(73) Assignee: SAP SE, Walldorf (DE)

( * ) Notice: Subject to any disclaimer, the term of this patent is extended or adjusted under 35 U.S.C. 154(b) by 355 days.

(21) Appl. No.: 13/926,983

(22) Filed: Jun. 25, 2013

(65) Prior Publication Data
US 2014/0379754 A1 Dec. 25, 2014

(51) Int. Cl.
*G06F 7/00* (2006.01)
*G06F 17/00* (2006.01)
*G06F 17/30* (2006.01)

(52) U.S. Cl.
CPC ............... *G06F 17/30448* (2013.01)

(58) Field of Classification Search
None
See application file for complete search history.

(56) References Cited

U.S. PATENT DOCUMENTS

| | | | |
|---|---|---|---|
| 5,669,013 A | 9/1997 | Watanabe et al. | |
| 5,852,821 A | 12/1998 | Chen et al. | |
| 6,115,646 A * | 9/2000 | Fiszman | G06F 9/465 700/104 |
| 6,341,281 B1 | 1/2002 | MacNicol et al. | |
| 6,438,741 B1 * | 8/2002 | Al-omari et al. | 707/694 |
| 6,564,204 B1 * | 5/2003 | Amundsen et al. | 707/714 |
| 6,741,959 B1 | 5/2004 | Kaiser | |
| 6,757,587 B1 * | 6/2004 | English | B25J 9/1656 318/16 |
| 7,299,135 B2 | 11/2007 | Thayer | |
| 7,366,713 B2 * | 4/2008 | Kaluskar | G06F 17/2241 707/769 |
| 7,454,701 B2 | 11/2008 | Graeber | |
| 7,574,424 B2 | 8/2009 | Chowdhuri | |

(Continued)

OTHER PUBLICATIONS

Yannis E. Ioannidis; Query Optimization; 1996; CRC Press; pp. 1-3.*

*Primary Examiner* — Mariela Reyes
*Assistant Examiner* — Jermaine Mincey
(74) *Attorney, Agent, or Firm* — Fountainhead Law Group P.C.

(57) ABSTRACT

In one embodiment, a method receives a query for analyzing data in a database. The method then determines a constant in the query and determines an operator applied to the constant in the query. The operator explicitly controls a behavior of the constant. The constant is represented as a scalar representation in the query instead of as a vectorial representation where the constant would have been used as the vectorial representation without the use of the operator due to a rule governing use of constants. Then, the method performs a calculation for the query to determine a query result using the constant as the scalar representation.

20 Claims, 9 Drawing Sheets

(56) References Cited

U.S. PATENT DOCUMENTS

| | | |
|---|---|---|
| 8,250,529 B2 | 8/2012 | Chawla et al. |
| 8,385,192 B2 | 2/2013 | Akirav et al. |
| 2005/0097464 A1* | 5/2005 | Graeber ................. 715/700 |
| 2006/0010147 A1 | 1/2006 | Arras et al. |
| 2006/0224946 A1* | 10/2006 | Barrett ............... G06F 17/246 715/210 |
| 2007/0169039 A1* | 7/2007 | Lin ............................ 717/146 |
| 2008/0114806 A1* | 5/2008 | Kosche ................... 707/104.1 |
| 2009/0077001 A1* | 3/2009 | Macready .............. G06N 5/02 706/57 |
| 2009/0150426 A1* | 6/2009 | Cannon ............... G06F 17/246 |
| 2010/0082524 A1 | 4/2010 | Barber |
| 2010/0121869 A1* | 5/2010 | Biannic ............ G06F 17/30592 707/759 |
| 2012/0117054 A1* | 5/2012 | Shrinivas ......... G06F 17/30469 707/713 |
| 2012/0123962 A2 | 5/2012 | Brunswig et al. |
| 2012/0226639 A1 | 9/2012 | Burdick et al. |
| 2013/0086019 A1* | 4/2013 | Dantale ...................... 707/705 |
| 2013/0109989 A1 | 5/2013 | Busse et al. |

\* cited by examiner

500 →

| Characteristic C (Calendar Month) | Keyfigure K1 Amount | Restricted keyfigure K2 Amount in January | Keyfigure K3 |
|---|---|---|---|
| c1 January 2013 | 15 USD | 15 USD | 10 |
| c2 February 2013 | 50 USD | NULL | 20 |
| c3 March 2013 | 20 USD | NULL | 30 |
| c4 April 2013 | 10 USD | NULL | 40 |

| Characteristic C (Calendar Month) | Keyfigure K1 Amount | Restricted keyfigure K2 Amount in January 503 | $K1 + K2$ 508 |
|---|---|---|---|
| c1 January 2013 | 15 USD | 15 USD  504 | 30 USD |
| c2 February 2013 | 50 USD | NULL  506-1 | 50 USD |
| c3 March 2013 | 20 USD | NULL  506-2 | 20 USD |
| c4 April 2013 | 10 USD | NULL  506-2 | 10 USD |

| Key Figures | Calendar Month C | | | | |
|---|---|---|---|---|---|
| | Jan | Feb | March | April | Total |
| Keyfigure K3 | 10 | 20 | 30 | 40 | 100 |
| K3 in Jan with CS | 10 | 10 | 10 | 10 | 10 |
| SUM(K3 in Jan with CS * 3) over C | 30 | 30 | 30 | 30 | 30 |
| SUM(K3 in Jan with CS * 3 in Feb) over C | NULL | NULL | NULL | NULL | NULL |
| SUM(K3 in Jan with CS * 3 in Jan) over C | 30 | NULL | NULL | NULL | 30 |
| SUM(K3 in Jan with CS * 3 in Jan CS) over C | 30 | 30 | 30 | 30 | 30 |
| SUM(K3 in Jan with CS * SCAL( 3 in Jan ) ) over C | 30 | 30 | 30 | 30 | 30 |
| SUM(K3 in Jan with CS * SCAL( 3 in Feb ) ) over C | 30 | 30 | 30 | 30 | 30 |

702 — Keyfigure K3
704 — K3 in Jan with CS
706 — SUM(K3 in Jan with CS * 3) over C
708 — SUM(K3 in Jan with CS * 3 in Feb) over C
710 — SUM(K3 in Jan with CS * 3 in Jan) over C
712 — SUM(K3 in Jan with CS * 3 in Jan CS) over C
714 — SUM(K3 in Jan with CS * SCAL( 3 in Jan ) ) over C
716 — SUM(K3 in Jan with CS * SCAL( 3 in Feb ) ) over C

FIG. 7A

| Calendar Month C | K3 in Jan with CS | 3 in Feb | K3 in Jan with CS * 3 in Feb |
|---|---|---|---|
| Jan | 10 | NULL | NULL |
| Feb | NULL | 3 | NULL |

| Calendar Month C (Reference Characteristic) | K3 in Jan with CS | 3 in Jan | K3 in Jan with CS * 3 in Jan |
|---|---|---|---|
| Jan | 10 | NULL | NULL |

FIG. 7C

| Calendar Month C (Reference Characteristic) | K3 in Jan with CS | SCAL( 3 in Jan) | K3 in Jan with CS * 3 in Jan |
|---|---|---|---|
| Jan | 10 | 3 | 30 |

FIG. 7D

OPERATORS FOR CONSTANTS IN AGGREGATED FORMULAS

BACKGROUND

When analyzing data stored in a database, due to the way the database rules are formulated, a user may not receive the expected results that the user desires for a query. In one example, a user may use a constant in a formula of the query. A constant is a value that does not change when calculating the formula with different sets of operands. The database rules define an implicit behavior of how the constant is handled in the formula. For example, the database rules may determine that a constant behaves like a vector if certain database rules are met based on the formula. However, if the certain database rules are not met, then the constant may behave like a scalar. The scalar representation may use less computing resources than the vectorial representation. This is because the scalar representation does not have its own data representation. That is, the scalar value only exists when it is needed. For example, if the formula calculates the average revenue for a product multiplied by a constant for each month of the year, the constant is needed only when a value for a month exists. That is, if the value for a month is NULL, then the constant is not needed. However, the vectorial representation represents the constant for all values for a component of the formula and is needed when the formula result is aggregated again. For example, if a formula is the average revenue for a product added to a constant for each month of the year, then the vectorial representation of a constant is used to include the constant value for all values of the calendar month.

SUMMARY

In one embodiment, a method receives a query for analyzing data in a database. The method then determines a constant in the query and determines an operator applied to the constant in the query. The operator explicitly controls a behavior of the constant. The constant is represented as a scalar representation in the query instead of as a vectorial representation where the constant would have been used as the vectorial representation without the use of the operator due to a rule governing use of constants. Then, the method performs a calculation for the query to determine a query result using the constant as the scalar representation.

In one embodiment, a non-transitory computer-readable storage medium contains instructions, that when executed, control a computer system to be configured for: receiving a query for analyzing data in a database; determining a constant in the query; determining an operator applied to the constant in the query, wherein the operator explicitly controls a behavior of the constant; representing the constant as a scalar representation in the query instead of as a vectorial representation, wherein the constant would have been used as the vectorial representation without the use of the operator due to a rule governing use of constants; and performing a calculation for the query to determine a query result using the constant as the scalar representation.

In one embodiment, an apparatus includes: one or more computer processors; and a non-transitory computer-readable storage medium comprising instructions, that when executed, control the one or more computer processors to be configured for: receiving a query for analyzing data in a database; determining a constant in the query; determining an operator applied to the constant in the query, wherein the operator explicitly controls a behavior of the constant; representing the constant as a scalar representation in the query instead of as a vectorial representation, wherein the constant would have been used as the vectorial representation without the use of the operator due to a rule governing use of constants; and performing a calculation for the query to determine a query result using the constant as the scalar representation.

The following detailed description and accompanying drawings provide a better understanding of the nature and advantages of particular embodiments.

BRIEF DESCRIPTION OF THE DRAWINGS

FIG. 5A shows an example of a database table for a query illustrating the use of a constant according to one embodiment.

FIG. 5B shows the calculation of the inner formula of K1+K2 according to one embodiment.

FIG. 7A shows a table of an example query result according to one embodiment.

FIG. 7B shows the results for a formula in the table of FIG. 7A.

FIG. 7C shows additional results for a formula in the table of FIG. 7A.

FIG. 7D shows further results for a formula in the table of FIG. 7A.

DETAILED DESCRIPTION

Described herein are techniques for processing constants in a database system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
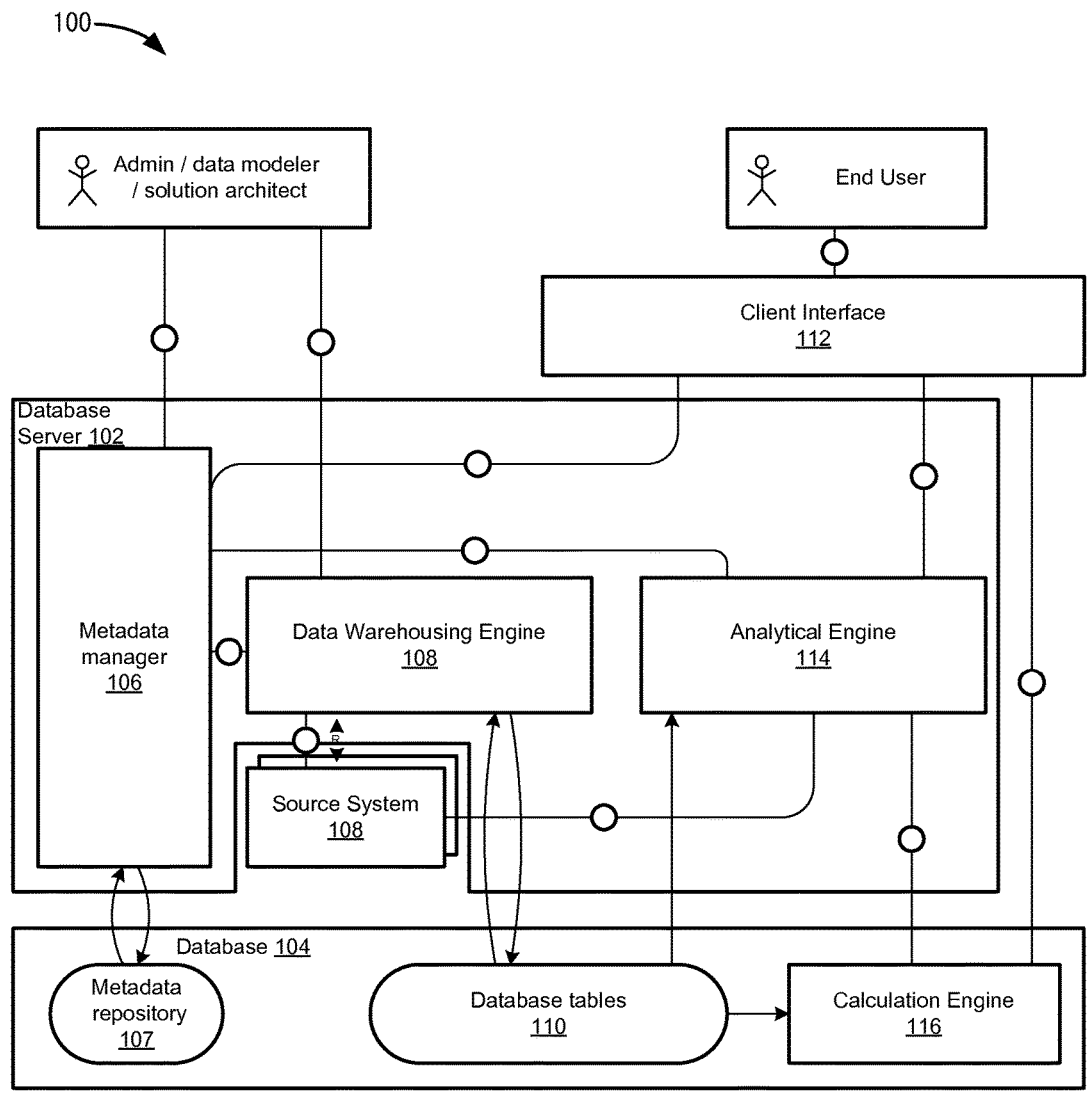
FIG. 1 depicts a simplified system for performing database operations according to one embodiment.

FIG. 1 depicts a simplified system 100 for performing database operations according to one embodiment. A database server 102 interacts with a database 104. An admin, data modeler, or a solution architect may model metadata in a metadata repository 107 for database 104 through a metadata manager 106. The metadata may include modeling what operators can be used in formulas in queries. Also, the metadata models the rules that an analytical engine 114 uses to calculate the results of the formulas in the queries.

A data warehousing engine 108 extracts and transforms data from sources 108, and stores the data in database tables 110 of database 104. Once the data is stored in database tables 110, an end user may use a client interface 112 to access the data. For example, the end user accesses an analytical engine 114 to perform queries on data stored in database tables 110. In one example, analytical engine 114 may interact with a calculation engine 116 that can perform additional operations to calculate results for the queries using data stored in database tables 110. The results from the queries are then output to the end user through client interface 112.

As will be described in more detail below, analytical engine 114 may evaluate formulas in queries based on operators that explicitly govern the behavior of constants in formulas. For example, a user may associate an operator with a constant in a query. Then, analytical engine 114 uses explicit behavior rules for the operator to represent the constant when calculating a formula in the query. In one embodiment, the operator may be a scalar (SCAL( )) operator or a vector (VECT( )) operator. The SCAL( ) operator forces the constant to behave like a scalar and the VECT( ) operator forces the constant to behave like a vector.

Figure 2:
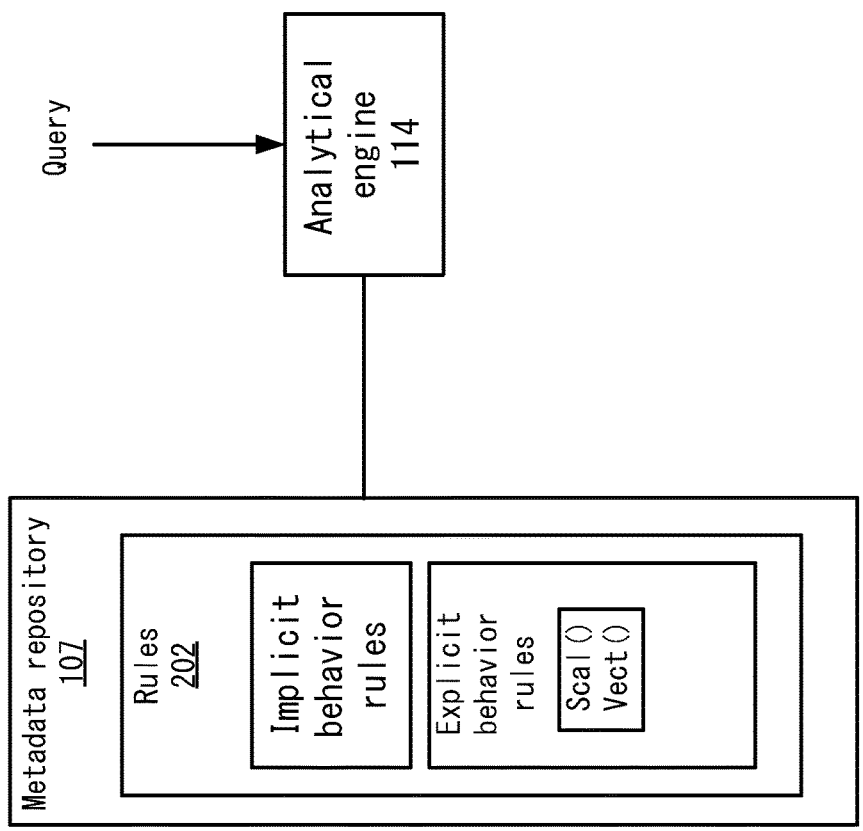
FIG. 2 shows a more detailed example of system according to one embodiment.

FIG. 2 shows a more detailed example of system 100 according to one embodiment. As shown, metadata repository 107 includes rules 202 that govern how analytical engine 114 evaluates queries. For example, analytical engine 114 may calculate formulas within the queries based on rules 202. As shown, rules 202 include implicit behavior rules for constants and explicit behavior rules for constants.

Implicit behavior rules for constants are rules that analytical engine 114 implicitly follows. That is, based on the context of the formula being calculated, analytical engine 114 follows the implicit behavior rules to calculate the formula. In one embodiment, analytical engine 114 evaluates the implicit behavior rules to determine how a constant should behave in the formula, such as if a constant in the formula should be represented as a vectorial representation or a scalar representation. The scalar representation may be where the constant is represented as a single value. The vectorial representation is where the constant is represented by multiple values. For example, if a drill-down into the months of the calendar year is being performed, then a constant value may be represented for each of the calendar months in a vectorial representation.

The explicit behavior rules provide operators that may be used in the formula to explicitly control the behavior of the constant. For example, the operators may control the behavior of the constant to be a vectorial representation or a scalar representation. As discussed above, scalar operators and vector operators are provided. When the scalar and vector operators are used in the formula, analytical engine 114 controls the constant based on the operator used and does not evaluate the implicit behavior rules to determine how to represent the constant. Rather, if a formula defines the constant using the scalar operator, then analytical engine 114 represents the constant as the scalar representation. Also, if the vector operator is used, analytical engine 114 represents the constant as a vectorial representation.

Figure 3:
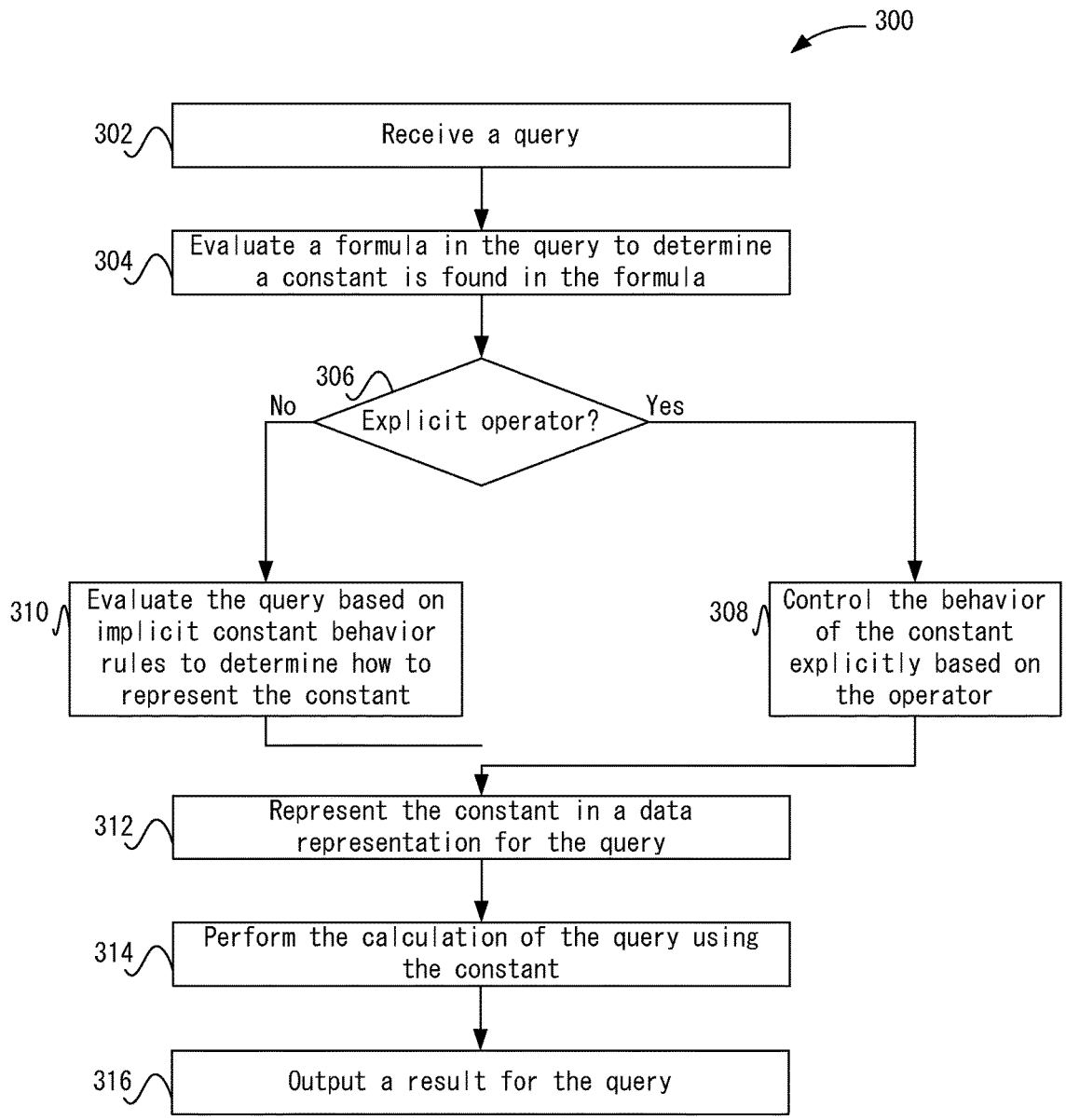
FIG. 3 depicts a simplified flowchart of a method for evaluating the behavior of constants according to one embodiment.

FIG. 3 depicts a simplified flowchart 300 of a method for evaluating the behavior of constants according to one embodiment. At 302, analytical engine 114 receives a query. At 304, analytical engine 114 evaluates a formula in the query to determine a constant is found in the formula. Due to a constant being found in the formula, analytical engine 114 needs to determine how the constant should be represented. At 306, analytical engine 114 determines if an explicit behavior operator is associated with the constant. For example, the SCAL( ) operator or the VECT( ) operator may have been associated with the constant in the formula.

At 308, if one of the explicit behavior operators is associated with the constant, analytical engine 114 controls the behavior of the constant explicitly based on the operator. For example, if the SCAL( ) operator is associated with the constant, then analytical engine 114 represents the constant as a scalar value. Also, if the VECT( ) operator is associated with the constant, then analytical engine 114 represents the constant as a vector.

If an explicit behavior operator is not associated with the constant, at 310, analytical engine 114 evaluates the query based on implicit constant behavior rules to determine how to represent the constant. For example, the query is evaluated to determine if the constant should behave like a vector or a scalar. The evaluation of implicit behavior rules will be described in more detail below.

At 312, analytical engine 114 represents the constant in a data representation for the query. For example, if the constant is being represented as a scalar value, then analytical engine 114 represents the value as a scalar value. However, if the constant is being represented as a vector, analytical engine 114 represents the constant as a vectorial representation. In this case, analytical engine 114 may store values for constant for each component of a drill down. Also, analytical engine 114 extracts any other data that is needed for calculating the formula found in the query.

At 314, analytical engine 114 performs the calculation of the query using the constant. At 316, analytical engine 114 outputs a result for the query. For example, analytical engine 114 may output a result for the query to the user that submitted the query.

Before describing the implicit behavior rules, aggregation and the use of constants in aggregations will be described.

Aggregation

Analytical engine 114 may define and calculate formulas with one or more exception aggregation reference characteristics. The input data for these formulas is implicitly aggregated up to the granularity or grouping level the formula calculation requires, and then the formula is calculated to determine formula results. Afterwards, the formula results are then aggregated over the remaining exception aggregation reference characteristics of the formula. The term characteristic may also be referred to as a dimension and the term key figure as used herein may often be referred to as a measure. The following summarizes aggregation in analytical engine 114.

Figure 4:
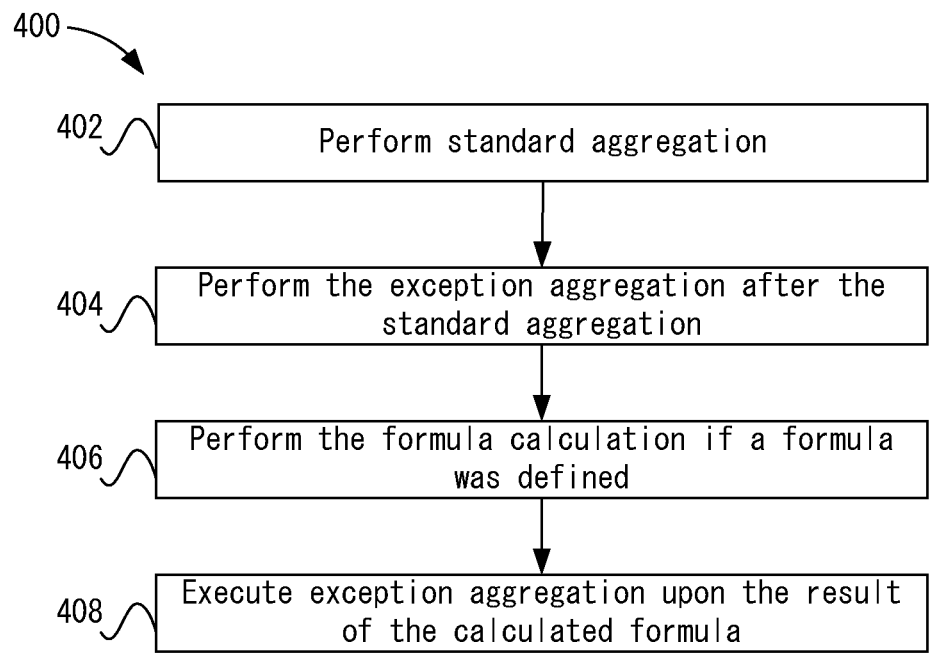
FIG. 4 depicts a simplified flowchart that shows the steps of aggregation according to one embodiment.

FIG. 4 depicts a simplified flowchart 400 that shows the steps of aggregation according to one embodiment. At 402, analytical engine 114 performs standard aggregation. Standard aggregation may be performed with the options of SUM, MIN, and MAX.

At 404, if exception aggregation is set up, analytical engine 114 performs the exception aggregation after the standard aggregation. Exception aggregation includes options such as SUM (default), MIN, MAX, AVG, FIRST, LAST, NOP, COUNT, STANDARD DEVIATION, VARIANCE, etc.

At 406, analytical engine 114 performs the formula calculation if a formula was defined. After the formula calculation, at 408, analytical engine 114 may execute exception aggregation upon the result of the calculated formula. This may be the same step as the exception aggregation executed before, but the formula exception aggregation operates on the formula results. As will be discussed below, the SCAL( ) and VECT( ) operators may be used in exception aggregated formulas in which a result of an aggregation is aggregated again.

Constant Processing in Analytical Engine 114

A constant may be been used in conjunction with aggregation in a query. FIG. 5A shows an example of a database table 500 for a query illustrating the use of a constant according to one embodiment. Analytical engine 114 calculates a formula of MAX(K1+K2) over C, where MAX is a maximum function, K1 and K2 are key figures, and C is the calendar month. The formula is an exception aggregated formula as the results of the formula K1+K2 are used to determine the calculation for the MAX formula.

The MAX formula requires that the input data is aggregated up to the granularity level that the formula calculation requires. Then, the results of the formula calculation are again aggregated over the exception aggregation reference characteristics of the formula. In this case, the formula exception aggregation is taking the maximum over the calendar month for the formula result of K1+K2. The calculation part of the formula exception aggregation can be modeled formally as follows:

Let M be a set of characteristic values, and let N and F be subsets of M, that is, $N, F \subseteq M$.
Let $r: N \rightarrow V$ and $g: F \rightarrow W$ represent keyfigures.
Let $\bowtie: (V \cup \{NULL\}) \times (W \cup \{NULL\}) \rightarrow D$ be a binary function, in the example it is + with its specific NULL handling.
The mapping $\bowtie$ can be lifted to $$\bowtie_{N,F}: V^N \times W^F \rightarrow D^{N \cup F}$$

where for $l \in F \cup N$ we define $$\bowtie_{N,F}(r, g)(l) := \begin{cases} r(l) & \bowtie & g(l) \text{ if } l \in F \cap N \\ r(l) & \bowtie & NULL \text{ if } l \in N \setminus F \\ NULL & \bowtie & g(l) \text{ if } l \in F \setminus N \end{cases}$$

The keyfigure K1 has components for January, February, March and April and can be modeled as mapping r where N={c1, c2, c3, c4} and V={15 USD, 50 USD, 20 USD, 10USD} and r(c1)=15 USD etc. . . . , whereas the restricted keyfigure K2 has only components for January and can be modeled as mapping g where F={c1} and W={15 USD} and (obviously) g(c1)=15USD.
When vectors with differing component structures are combined with an exception aggregated formula, the missing components are completed with NULL.

FIG. 5B shows the calculation of the inner formula of K1+K2 according to one embodiment. At 503, a column for restricted key figure K2 over the calendar month is shown. In this column, the value for the month of January is only provided when the restriction is over the month of January. Thus, at 504, the value of 15 USD is provided. However, at 506-1, 506-2, and 506-3, respectively, the value of "NULL" is included due to the restriction not applying to the calendar month. NULL means that the value does not exist for that cell. The value of NULL may be different from the value of 0.

At 508, the formula is calculated component-wise. As shown, key figure K1 is added with key figure K2 to determine formula results in the column shown at 508.

Analytical engine 114 then aggregates the results according to the aggregation function over the reference characteristic of calendar month. That is, the maximum of the result for each calendar month is calculated as follows:

MAX(30 USD, 50 USD, 20 USD, 10 USD)=50 USD

In this case, the maximum of the formula results calculated for K1+K2 is taken. As can be seen, analytical engine 114 determines that 50 USD is the maximum of these formula results.

The above example did not use constants; however, constants may be used in exception aggregated formulas. Also, although constants are described with respect to exception aggregated formulas, the constants may be used in other aggregations.

Constants in Exception Aggregated Formulas

If a formula contains constants, analytical engine 114 may treat the behavior of these constants in two different ways. For example, the constant may have its own data representation or may not have its own data representation.

Figure 6A:
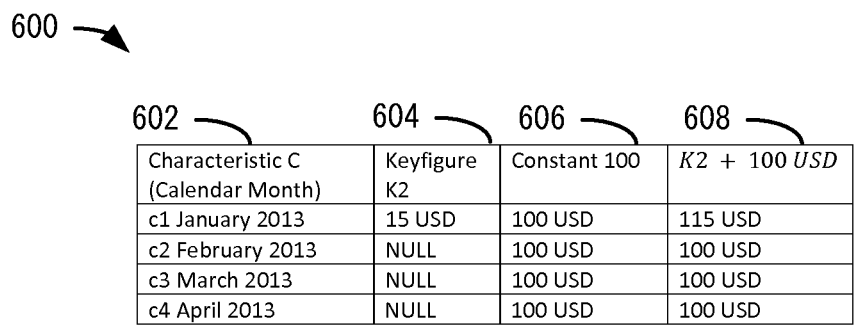
FIG. 6A shows a database table including data summarizing the formula of SUM(K2+100 USD) according to one embodiment.

When a constant has its own data representation, the constant behaves like a key figure. In this case, the constant behaves as if it would have been booked inside a multi-dimensional data model and would have the constant value and the granularity the formula is defined on. To illustrate this, the exception aggregated formula of SUM(K2+100 USD) over C is used. FIG. 6A shows a database table including data summarizing the formula of SUM(K2+100 USD) according to one embodiment. At 602, the characteristic C of calendar month is provided for the months of January 2013, February 2013, March 2013, and April 2013. At 604, the values for the key figure K2 are provided. The key figure in K2 may be restricted to the amount in January as described above with respect to FIG. 5B. In this case, January has a value of 15 USD and February, March, and April have the value of NULL. At 606, a constant of 100 USD is provided. Reviewing the formula above, the result of K2+100 USD is shown in a column at 608. As can be seen, the values in the columns shown at 604 and 606 are added together. Even though the months February, March, and April include a NULL value for key figure K2, the addition of the constant 100 USD still affects the result of the addition.

After calculating the result of the formula K2+100 USD, analytical engine 114 performs the exception aggregation to determine the sum of the formula results as follows:

SUM(115 USD+100 USD+100 USD+100 USD)=415 USD

The constant behaves as if it had been booked inside the multi-dimensional data model with a value of 100 for every distinct calendar month. In this case, the constant is a vectorial constant. That is, a value of 100 needs to be represented in the data model for each month of January, February, March, and April. The vectorial constant may be an expensive constant to process by analytical engine 114 because the constant needs its own data representation in data for the query (e.g., the preliminary database result set) fetched by analytical engine 114. That is, analytical engine 114 needs to monitor the existence of the constant value independently from other parts of the formula.

Figure 6B:
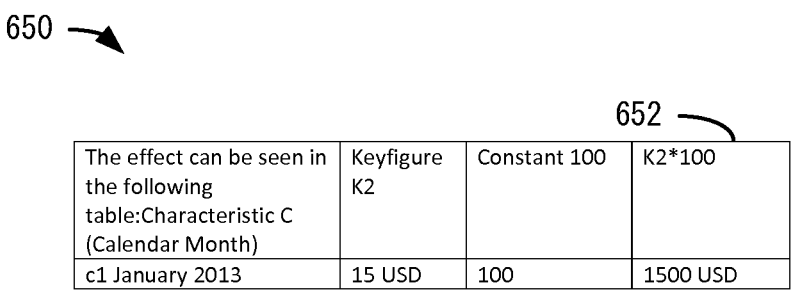
FIG. 6B shows a table including the result of the calculation of the formula K2*100 according to one embodiment.

A constant may also not have its own data representation. In this case, the constant behaves as a scalar value. The data representation for the scalar value is triggered by other formula operands. For example, using the formula SUM (K2*100) over C, the constant of "100" may be a scalar value. In this case, the formula is only calculated whenever a value exists for K2. This is because when K2 is NULL, then the value of the constant does not matter as the result of a multiplication with a NULL value will always be NULL. FIG. 6B shows a table 650 including the result of the calculation of the formula K2*100 according to one embodiment. Only the value for January 2013 is calculated and a result shown at 652. Then, analytical engine 114 performs the exception aggregated formula SUM(K2*100) is SUM (1500 USD)=1500 USD.

The constant in FIG. 6B does not need a data representation because its existence is dependent upon the existence of the key figure K2. In this case, analytical engine 114 does not have to represent the constant as a vector value. Rather, the constant is represented as a scalar value and only used when analytical engine 114 determines that key figure K2 exists. Using the constant as a scalar value is cheaper to process because values for each component of the drill down do need to be stored.

Implicit Behavior Rules

As mentioned above, metadata 107 may model implicit behavior rules that analytical engine 114 uses to evaluate constants in formulas. In one example, analytical engine 114 evaluates the formula to determine if the constant should be modeled as a vectorial representation. If none of the implicit behavior rules indicate the constant should be modeled as a vectorial representation, then analytical engine 114 models the constant as a scalar representation. The following implicit behavior rules may be used, but others may be contemplated:

1. A constant behaves like a vector if the constant has no key figure context. This means that the constant is not connected to a key figure within the formula or only connected via operators +, −, AND, OR, XOR, and two-digit Boolean operators. This constant may be referred to as an "unconnected constant." That is, the constant is not dependent upon the value of the key figure within the formula.
2. A constant behaves like a vector if the constant contains a filter explicitly set for the constant and this filter does not completely include the filter of the connected key figure context. For example, the filter may remove a group-by value for a reference characteristic for the constant. In one example, the following formula may be evaluated:

SUM((K1 in Jan, Feb)*(100 in Jan)) over C, where K1 is a key figure with the restriction of the reference characteristics in January and February and 100 is a constant with a restriction in January, and the results of the formula are summed over the calendar month C. In the above formula, the constant 100 only exists in January. Thus, analytical engine 114 must model the constant as having its own data representation so that it can monitor when the constant exists. That is, analytical engine 114 models the value of 100 in January and adds the values of NULL for the other calendar months. In this case, the vectorial representation needs to be used.

3. In all other cases, the constant becomes a scalar representation. That is, filtered constants are scalar representations. That means in all other cases there is a key figure part in the formula that defines the group by values for which the formula needs to be calculated, and the constant exists for all of the group by values defined by that key figure part, and the formula operator returns NULL when the key figure part of the formula is NULL. In these cases the constant cannot have a "standalone" effect on the result of the formula.

The above rules can be derived from the math representation of the operation ⋈. The scalar representation can be used as an optimization for the vectorial representation, if the following 2 conditions apply. This assumes that the constant is the $2^{nd}$ operand of $⋈_{N,F}$:

(1) $N \subseteq F$. This implies that the constant has the same value for all components of the keyfigure part.
(2) ⋈ defines its NULL handling such that ⋈ (NULL, X)=NULL, that is, if the keyfigure operand is NULL, the formula result is NULL, and the constant needs no own data representation.

If the constant is the 1st operand, the dual of the above conditions can be derived as follows:

(1) $F \subseteq N$. Again, this implies that the constant has the same value for all components of the keyfigure part.
(2) ⋈ defines its NULL handling such that ⋈ (X, NULL)=NULL, that is, if the keyfigure operand is NULL, the formula result is NULL, and the constant needs no own data representation.

In the above, if the constant is a $2^{nd}$ operand of a formula and the key figure operand that is the $1^{st}$ operand is NULL, the formula result will be NULL. Because the result is NULL, the constant does not need its own data representation. Therefore, the dual condition also is true.

Explicit Behavior Rules

As mentioned above, constant behavior may be explicitly controlled by using the operators of SCAL( ) and VECT( ) that are associated with or applied directly to a constant within a formula. When used in a formula, the operator explicitly controls the behavior of the constant.

The use of the scalar operator causes analytical engine 114 to represent the constant as a scalar value when calculating a result of the formula. This provides better performance as the scalar value uses less resources than if the constant was represented as a vector value. That is, a vectorial constant creates a large performance impact by increasing the filter. Also, when not explicitly controlled, a constant used in a formula together with another operand that has constant selection set for its filter, the result received may not be the result the user expected. Constant selection defines a separate filter context, where either the complete outside filter or parts of the outside filter are ignored. A filtered constant that is connected to a key figure with constant selection might not lead to the expected result in all cases. In this case, it may be beneficial for a user to use the scalar operator such that the user can explicitly control the behavior the user intends. An example illustrating this behavior is shown at 710 below.

FIG. 7A shows a table 700 of an example query result according to one embodiment. The table shows results for different queries that may or may not use the SCAL( ) operator. At 702, the result for the key figure K3 is shown as 10, 20, 30, and 40 in the months of January, February, March, and April, respectively. The formula of SUM(key figure K3) over calendar month provides the result of 100. In this case, the results of key figure K3 are summed.

At 704, the formula of K3 in Jan with CS results in a value of 10 for the months of January, February, March, and April. The constant selection of January ignores the context for each month and chooses the filter for January. Thus, the value for January is used. This is because the key figure K3 is restricted with constant selection in January. That is, the result is the same for January, February, March, and April due to the constant selection of the key figure K3 in January. Further, for the total, the value is K3 in January, which is 10.

At 706, the formula SUM(K3 in January with CS*3) over C results in the value of 30 for all months. Analytical engine 114 calculates the value of 30 because of the following rules: According to the implicit rules 3 is a scalar constant. Due to constant selection on the keyfigure K3 with the January filter for each month the result of K3 in Jan with CS is always 10. The group by values of characteristic C for the formula are defined by K3 in Jan with CS, and the only existing values is January in all cases. Therefore for all cells of row 706 the same calculation 10*3 takes place, which results in 30.

At 708, the formula SUM(K3 in Jan with CS*3 in Feb) over C is evaluated as NULL for each month. In this case, K3 in January is constantly selected and also the constant 3 is restricted to the month of February. K3 only has a value for January and the constant 3 only has a value for February and thus all values are NULL.

The value of K3 in Jan with CS is the same as described in 706. But this time 3 in Feb is a vectorial constant according to the implicit rules, as it contains a filter that does not completely include the filter of the other formula operands. In this case, the values are NULL because the constant 3 is restricted only in the month of February. However, the key figure K3 is only valid in January. Thus, for the calculation for the month of January, the value for January is 10 and the value for the constant is NULL resulting in a value of NULL. FIG. 7B shows the results for this formula. At 750, the result for K3 in January with CS is 10. However, at 752, the result of the constant with a restriction for February is NULL because the month of January is being considered. This results in a NULL value shown at 754. For the month of February, at 756, the value is NULL for K3 in Jan with CS. This is because the month of February is being used. At 758, the constant value of 3 is used because this calculation meets the requirements of the reference characteristic of February. However, at 760, the result is NULL as NULL multiplied by 3 is NULL.

Referring back to FIG. 7A, at 710, the formula SUM(K3 in Jan with CS*3 in Jan) over C results in the value of 30, NULL, NULL, NULL for the months of January, February, March, and April, respectively. The value for the constant 3 in January is 3, but NULL for other months. According to the implicit rules the constant 3 in January is a vectorial constant, because its filter does not completely include the filter of the other operands. A non-constant selection context can never include the filter of a constant selection context. This results in a value of NULL for February, March, and April. The keyfigure K3 in January with CS is calculated again in the same way as in 706. The result of 30 for January is received because the constant is restricted to a reference characteristic of January and thus for the January month the formula is calculated as 10*3=30. For the rest of the months, the value of K3 is NULL and the value for the constant is NULL meaning the value is NULL as shown in FIG. 7C.

At 712, the formula SUM(K3 in Jan with CS*3 in Jan CS) over C results in the value of 30 for each month. The constant selection of the constant 3 in Jan means that the reference characteristic in January is ignored for the constant and thus the value of 3 is used for all months. Thus, the constant selection of 3 in January removes the implicit filter from the column context and fixes the calendar month filter to 3. Moreover, according to implicit rules, in this case the constant becomes a scalar constant, because its filter completely includes the filter of the connected keyfigure K3 in Jan with CS. This results in the calculation of 10*3 for all months. Constant selection primarily influences the filter, not the order of aggregation. Key figures are implicitly aggregated according to the aggregation defined with the key figure. The constant selection of key figure K3 in Jan with CS looks the same for January, February, March, and April. However, when the constant selection is over a reference characteristic found in an outer formula, then the key figure is not aggregated over the calendar month when calculating the formula.

At 714, the scalar operator is used in the formula SUM (K3 in Jan with CS*SCAL(3 in Jan)) over C. In this case, the constant 3 is a scalar value and only used when the key figure K3 exists. Because K3 in Jan is selected with constant selection, the value of 10 is used for all months. Without using the SCAL( ) operator, analytical engine 114 would represent the constant 3 as a vector. Basically because of the SCAL( ) operator 714 behaves exactly the same as 712. Because of constant selection the calculation table for Feb, March and April is shown in FIG. 7D.

At 716, the scalar operator is used again in the formula SUM(K3 in Jan with CS*SCAL(3 in Feb)) over C. The calculation again results in the value of 30 for all months. The same result occurs because the constant 3 is used as a scalar value. With the constant selection of key figure K3 in Jan being used, the scalar value of 3 is used to calculate the formula for all months in which the value exists. Without using the SCAL( ) operator, analytical engine 114 would represent the constant 3 as a vector because the exception aggregation for the constant 3 is over Feb. and the exception aggregation for the key figure K3 is over Jan. This means the constant contains a filter explicitly set for the constant and this filter does not completely include the filter of the connected key figure context. For example, the filter for key figure K3 may remove a group-by value for a reference characteristic for the constant.

Particular embodiments provide many advantages. One advantage is performance gain. For the following formula "SUM(K1 in Jan*3) over calendar month", without the use of the vectorial representation an intermediate result is needed, that contains one tuple (Jan, K1), and as many tuples of (month, 3) as there are booked months in the data. Therefore, the data would need to be read without any filter just to determine these tuples, but at the very end only the data of January was needed. When this optimization takes place, such as in a high cardinality dimension like customer or product, the effect on the runtime is a factor of 10000 or more.

Figure 8:
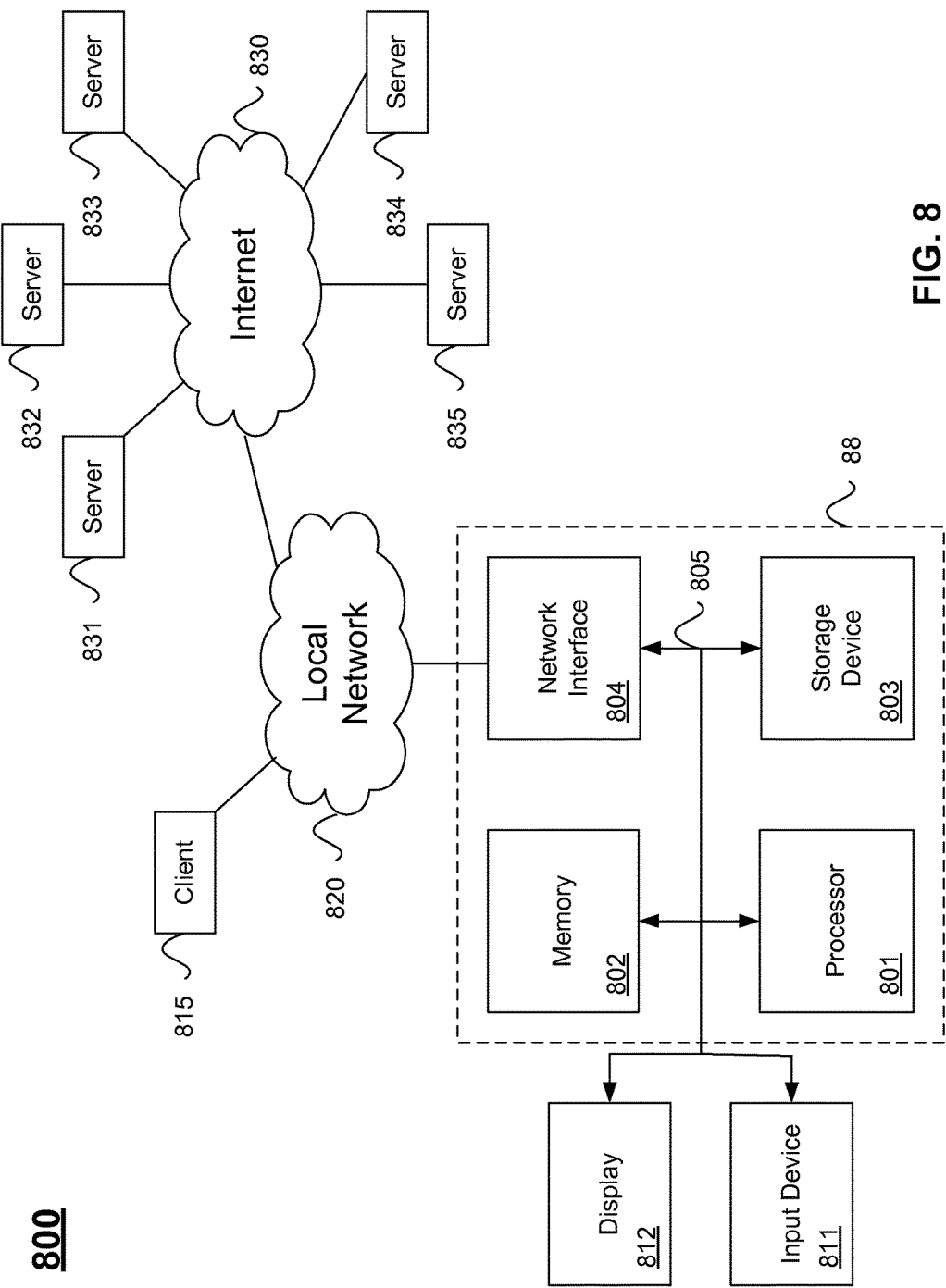
FIG. 8 illustrates hardware of a special purpose computing machine configured with analytical engine according to one embodiment.

FIG. 8 illustrates hardware of a special purpose computing machine configured with analytical engine 114 according to one embodiment. An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable storage mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information through the network interface 804 across a local network 820, an Intranet, or the Internet 830. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   storing, by a computing device, an implicit rule for how to represent constants in queries and an explicit rule for how to represent constants in the queries;
   receiving, by the computing device, a query for analyzing data in a database;
   determining, by the computing device, a constant in the query;
   evaluating, by the computing device, the query to determine whether a scalar operator is included in the query and applied to the constant in the query, wherein the scalar operator is associated with the explicit rule that explicitly controls that the constant is represented as a scalar representation;
   when the scalar operator is included in the query and applied to the constant, performing:
      representing, by the computing device, the constant as the scalar representation in the query due to the scalar operator being associated with the explicit rule while not evaluating the implicit rule to determine how to represent the constant, wherein an existence of a data representation of a single stored value for the scalar representation in the database is triggered by a component other than the scalar operator and the constant in the query not having a null value; and
      performing, by the computing device, a calculation for the query to determine a query result using the constant as the scalar representation;
   when the scalar operator is not included in the query and not applied to the constant, performing:
      evaluating, by the computing device, the query based on the implicit rule to determine whether to represent the constant as one of a vectorial representation and the scalar representation, wherein the existence of a data representation of multiple stored values for the vectorial representation in the database is monitored independently from other components of the query; and
      performing, by the computing device, the calculation for the query to determine the query result using the constant as one of the vectorial representation and the scalar representation.

2. The method of claim 1, wherein the scalar operator applies the constant in the query for all components in which the constant is triggered.

3. The method of claim 1, wherein the scalar representation represents the constant with the data representation for the constant when the component does not have the null value.

4. The method of claim 3, wherein the constant with the data representation is not stored for each component of the query that does not have the null value.

5. The method of claim 1, wherein the implicit rule states that the constant behaves as the vectorial representation if the constant is not connected to the component in the query.

6. The method of claim 5, wherein the implicit rule states that the constant behaves as the vectorial representation if a first filter is explicitly set for the constant and the first filter is not completely included in a second filter for the component connected to the constant.

7. The method of claim 6, wherein the implicit rule states that in all other cases, the constant is represented as the scalar representation.

8. The method of claim 1, wherein the query includes a constant selection of the component that removes a grouping characteristic from the calculation for the component.

9. The method of claim 1, wherein the constant is included in an exception aggregated formula over a reference characteristic that causes the constant to be represented as the vectorial representation if the scalar operator is not used.

10. The method of claim 1, further comprising:
receiving a second query for analyzing data in the database;
determining a second constant in the second query;
determining a vectorial operator is applied to the second constant in the second query, wherein the vectorial operator is associated with another explicit rule for how to represent constants in the queries;
representing the second constant as the vectorial representation according to the another explicit rule; and
performing a second calculation for the second query to determine a second query result using the constant as the vectorial representation.

11. A non-transitory computer-readable storage medium containing instructions, that when executed, control a computer system to be configured for:
storing an implicit rule for how to represent constants in queries and an explicit rule for how to represent constants in the queries;
receiving a query for analyzing data in a database;
determining a constant in the query;
evaluating the query to determine when a scalar operator is included in the query and applied to the constant in the query, wherein the scalar operator is associated with the explicit rule that explicitly controls that the constant is represented as a scalar representation;
when the scalar operator is included in the query and applied to the constant, performing:
representing the constant as the scalar representation in the query due to the scalar operator being associated with the explicit rule while not evaluating the implicit rule to determine how to represent the constant, wherein an existence of a data representation of a single stored value for the scalar representation in the database is triggered by a component other than the scalar operator and the constant in the query not having a null value; and
performing a calculation for the query to determine a query result using the constant as the scalar representation;
when the scalar operator is not included in the query and not applied to the constant, performing:
evaluating the query based on the implicit rule to determine whether to represent the constant as one of a vectorial representation and the scalar representation, wherein the existence of a data representation of multiple stored values for the vectorial representation in the database is monitored independently from other components of the query; and
performing, by the computing device, the calculation for the query to determine the query result using the constant as one of the vectorial representation and the scalar representation.

12. The non-transitory computer-readable storage medium of claim 11, wherein the scalar operator applies the constant in the query for all components in which the constant is triggered.

13. The non-transitory computer-readable storage medium of claim 11, wherein the scalar representation represents the constant with the data representation for the constant when the component does not have the null value.

14. The non-transitory computer-readable storage medium of claim 13, wherein the constant with the data representation is not stored for each component of the query that does not have the null value.

15. The non-transitory computer-readable storage medium of claim 14, wherein the implicit rule states that the constant behaves as the vectorial representation if the constant is not connected to the component in the query.

16. The non-transitory computer-readable storage medium of claim 15, wherein the implicit rule states that the constant behaves as the vectorial representation if a first filter is explicitly set for the constant and the first filter is not completely included in a second filter for the component connected to the constant.

17. The non-transitory computer-readable storage medium of claim 16, wherein the implicit rule states that in all other cases, the constant is represented as the scalar representation.

18. The non-transitory computer-readable storage medium of claim 11, wherein the constant is included in an exception aggregated formula over a reference characteristic that causes the constant to be represented as the vectorial representation if the scalar operator is not used.

19. The non-transitory computer-readable storage medium of claim 11, wherein the instructions are further configured for:
receiving a second query for analyzing data in the database;
determining a second constant in the second query;
determining a vectorial operator is applied to the second constant in the second query, wherein the vectorial operator is associated with another explicit rule for how to represent constants in the queries;
representing the second constant as the vectorial representation according to the another explicit rule; and
performing a second calculation for the second query to determine a second query result using the constant as the vectorial representation.

20. An apparatus comprising:
one or more computer processors; and
a non-transitory computer-readable storage medium comprising instructions, that when executed, control the one or more computer processors to be configured for:
storing an implicit rule for how to represent constants in queries and an explicit rule for how to represent constants in the queries;
receiving a query for analyzing data in a database;
determining a constant in the query;
evaluating the query to determine when a scalar operator is included in the query and applied to the constant in the query, wherein the scalar operator is associated with the explicit rule that explicitly controls that the constant is represented as a scalar representation;
when the scalar operator is included in the query and applied to the constant, performing:
representing the constant as the scalar representation in the query due to the scalar operator being associated with the explicit rule while not evaluating the implicit rule to determine how to represent the constant, wherein an existence of a data representation of a single stored value for the scalar representation in the database is triggered by a component other than the scalar operator and the constant in the query not having a null value; and performing a calculation for the query to determine a query result using the constant as the scalar representation;

when the scalar operator is not included in the query and not applied to the constant, performing:

evaluating the query based on the implicit rule to determine whether to represent the constant as one of a vectorial representation and the scalar representation, wherein the existence of a data representation of multiple stored values for the vectorial representation in the database is monitored independently from other components of the query; and performing, by the computing device, the calculation for the query to determine the query result using the constant as one of the vectorial representation and the scalar representation.

* * * * *